UNITED STATES PATENT OFFICE.

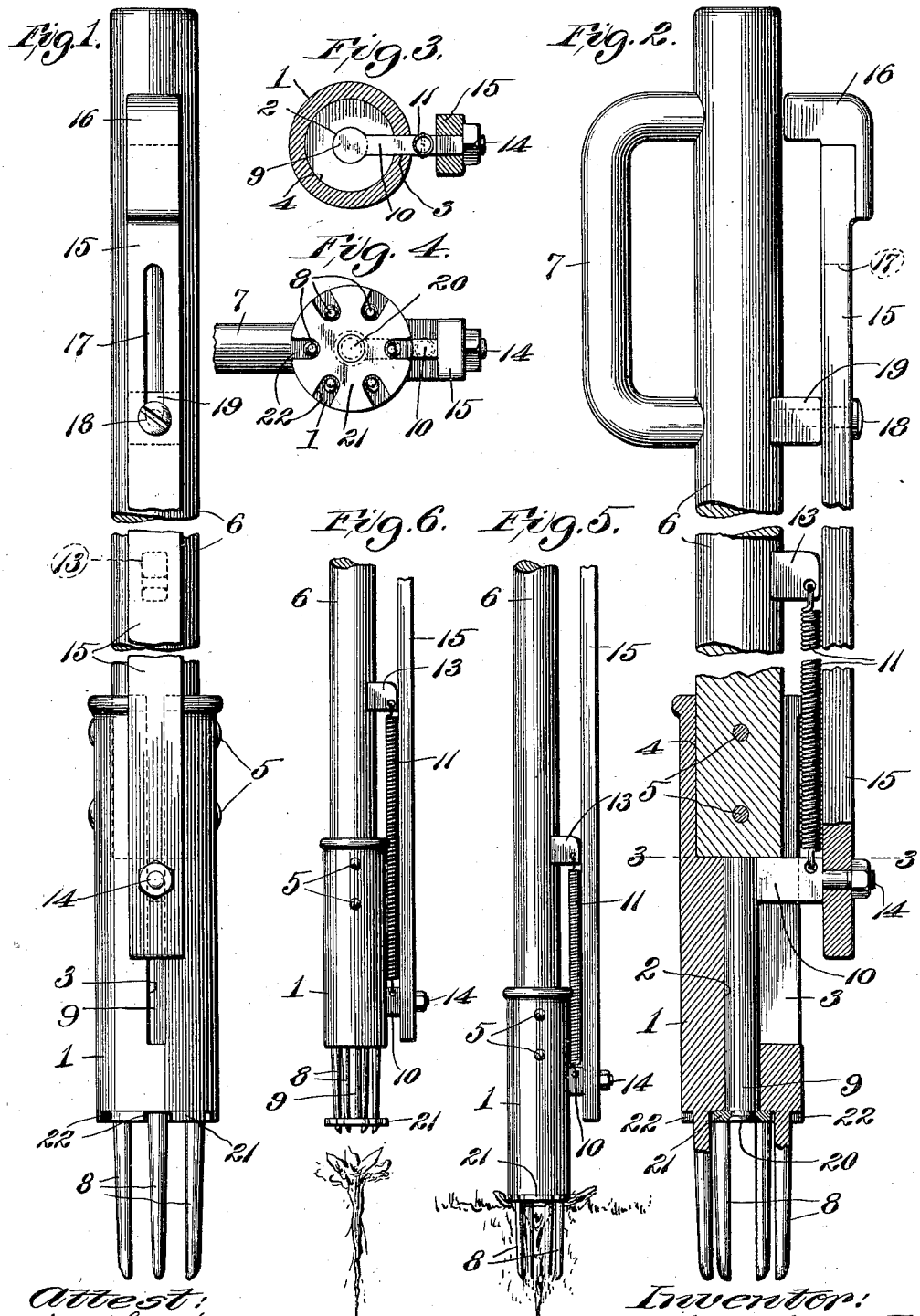

DAVID BITTNER, JR., OF ST. LOUIS, MISSOURI.

WEED-EXTRACTOR.

1,092,818.

Specification of Letters Patent. Patented Apr. 14, 1914.

Application filed May 15, 1913. Serial No. 767,790.

*To all whom it may concern:*

Be it known that I, DAVID BITTNER, Jr., a citizen of the United States, residing at the city of St. Louis, State of Missouri, have invented certain new and useful Improvements in Weed-Extractors, of which the following is a specification, reference being had to the accompanying drawing, forming a part hereof, in which—

Figure 1 is a front elevational view of a weed extractor embodying my invention; Fig. 2 is a side elevational view of the same partly in longitudinal section; Fig. 3 is a transverse sectional view on the line 3—3, Fig. 2; Fig. 4 is an inverted plan view of the lower end of my new weed extractor; Fig. 5 is a fragmentary side elevational view of my new weed extractor, showing the same with its teeth or prongs inserted in the ground and embracing the weed to be extracted; and Fig. 6 is a similar view, showing the same with the weed extracted and removed therefrom by its weed-ejecting member.

This invention relates to certain new and useful improvements in weed extractors.

The objects of my invention are to provide a weed extractor of simple and comparatively inexpensive construction, which will be strong, durable, efficient, and easy of operation, and in which the several parts will not be likely to get out of working order, and to improve generally upon devices of the kind stated.

With the above and other objects in view, my present invention resides in certain novel features of construction, arrangement, and combination of parts, all as will hereinafter be described and afterward pointed out in the claims.

Referring now to the accompanying drawings, in which like reference numerals refer to like parts throughout the several views, 1 indicates a preferably cylindrical member or body portion longitudinally and preferably centrally provided with a bore 2 of suitable length and having at one side an elongated longitudinally extending slot 3 communicating throughout its length with bore 2.

At its upper end, member 1 is preferably provided with a socket, as at 4, in which is seated and fixed, as by means of pins or the like 5, the lower end of an elongated pole or handle 6. Pole or handle 6 is of such length preferably as to extend with member 1 to about the waist of the average user, thereby obviating the necessity and consequent inconvenience on the part of the user of bending over when using my new weed extractor. Preferably pole or handle 6 is also conveniently provided adjacent its upper end with a grasping portion 7; and while I have herein shown body portion or member 1 and handle 6 as separate parts, yet it will be clear that the same might equally well be integrally formed, if desired. At its lower end, body portion or member 1 is preferably integrally provided with a plurality of elongated longitudinally extending teeth or prongs 8, teeth or prongs 8 being arranged in the form of an annular series preferably at the perimeter of body portion 1, as shown, and being adapted to be inserted into the ground and embrace the weed or the like to be extracted.

Longitudinally fitting and slidable in bore 2 of member or body-portion 1 is a rod or plunger 9 having a preferably integral laterally-extending arm or portion 10 projecting through and movable in slot 3. Suitably attached or fixed at one end to arm 10 is a coiled spring or the like 11 having its other end attached to a stud or the like 13 fixed at a suitable point on handle 6. Suitably fixed adjacent one end, as by means of a bolt or the like 14, to arm 10, is an elongated plunger-actuating or operating rod or member 15 provided at its upper end with a suitable handle 16. To maintain plunger-actuating member 15 in close and operative relation to handle 6, member 15 is preferably provided adjacent its upper end with an elongated longitudinal slot, as at 17, in which fits a headed screw or the like 18 seated in a block or member 19 fixed to handle 6.

Fixed, as by means of a screw or the like 20, to the lower end of plunger 9 and movable on the actuation of said plunger, longitudinally of and upon teeth or prongs 8, is an annular member or plate 21 having a diameter substantially the same as the diameter of body 1 and provided at its periphery with a plurality of radially-disposed cut-out portions or notches 22 to accommodate said teeth or prongs 8, as clearly seen in Fig. 4.

Normally spring 11 is adapted to hold plunger 9 and its carried plate 21 in the position thereof as shown in Fig. 2, with the lower end of plunger 9 substantially flush with, and plate 21 abutting flatwise against, the lower end of member 1. To now extract a weed or other obnoxious growth or the like, teeth or prongs 8 are inserted into the ground around such weed or the like to be extracted, as shown particularly in Fig. 5. By means of handle 7, the weeder as an entirety is now given, say, a quarter turn to dislodge the dirt embraced by teeth or prongs 8 and to loosen the roots of the weed or the like from the surrounding earth, after which by a sufficient pull on handle 6 teeth or prongs 8 are removed from the ground, carrying therewith the weed or the like embraced thereby. By means of rod 15 and plunger 9, plate 21 is now moved longitudinally of and upon prongs 8 to not only eject endwise therefrom the weed or the like so extracted and embraced thereby, but also remove any dirt or the like which may cling or adhere thereto, spring 11 resiliently afterward returning plate 21 to normal position.

My new weeder is easy of operation, comparatively simple and inexpensive in construction, obviates soiling of the hands, and I have from experience found the same to be most efficient in use, not only extracting the body of the weed, but also its roots.

I am aware that minor changes in the construction, arrangement, and combination of the several parts of my new weed extractor may be made and substituted for those herein shown and described without departing from the nature and principle of my invention.

Having thus described my invention, what I claim and desire to secure by Letters Patent is:

1. In a weed extractor, the combination with a longitudinally-bored body-portion provided at one end with a plurality of elongated longitudinally-extending prongs, said prongs being arranged in the form of an annular series at the perimeter of said body-portion and being adapted to be inserted into the ground and embrace the weed or the like to be extracted, of a plunger longitudinally fitting and slidable in the bore of said body-portion, means connected to said plunger for operatively actuating the same, an annular weed-ejecting and dirt-removing plate having a diameter substantially the same as the diameter of said body-portion fixed to one end of said plunger and adapted normally to abut flatwise against the said end of said body-portion, said plate being provided at its periphery with a plurality of radially-disposed notches for accommodating said prongs and being movable, on the actuation of said plunger, longitudinally of and upon said prongs to eject endwise therefrom the extracted weed or the like embraced thereby and dirt adhering thereto, and a coiled spring having connection with said plunger and said body-portion adapted to resiliently return said plunger and its carried plate to, and hold the same in, normal position; substantially as described.

2. In a weed extractor, the combination with a longitudinally-bored and slotted body-portion provided at one end with a plurality of elongated longitudinally-extending prongs, said prongs being arranged in the form of an annular series at the perimeter of said body-portion and being adapted to be inserted into the ground and embrace the weed or the like to be extracted, of a plunger longitudinally fitting and slidable in the bore of said body-portion, a laterally-extending arm fixed to said plunger and movable in said slot, a plunger-actuating member fixed to said arm, an annular weed-ejecting and dirt-removing plate having a diameter substantially the same as the diameter of said body-portion fixed to one end of said plunger and adapted normally to abut said plunger and adapted normally to abut flatwise against said end of said body-portion, said plate being provided at its periphery with a plurality of radially-disposed notches for accommodating said prongs and being movable on the actuation of said plunger longitudinally of and upon said prongs to eject endwise therefrom the extracted weed or the like embraced thereby and dirt adhering thereto, and a coiled spring having connection with said plunger and said body-portion adapted to resiliently return said plunger and its carried plate to, and hold the same in, normal position; substantially as described.

In testimony whereof, I have signed my name to this specification, in the presence of two subscribing witnesses.

DAVID BITTNER, Jr.

Witnesses:
RUTH PETERSON,
DAVID BITTNER.